US006622755B2

(12) United States Patent
Weber

(10) Patent No.: US 6,622,755 B2
(45) Date of Patent: Sep. 23, 2003

(54) HYDROPNEUMATIC ACCUMULATOR

(75) Inventor: Norbert Weber, Sulzbach (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 10/181,721

(22) PCT Filed: Jan. 17, 2001

(86) PCT No.: PCT/EP01/00442

§ 371 (c)(1),
(2), (4) Date: Jul. 22, 2002

(87) PCT Pub. No.: WO01/55602

PCT Pub. Date: Aug. 2, 2001

(65) Prior Publication Data

US 2003/0000589 A1 Jan. 2, 2003

(30) Foreign Application Priority Data

Jan. 29, 2000 (DE) ........................................ 100 03 648

(51) Int. Cl.[7] ................................................ F16L 55/04
(52) U.S. Cl. ........................................................ 138/30
(58) Field of Search ..................................... 138/30, 31

(56) References Cited

U.S. PATENT DOCUMENTS 2,688,984 A * 9/1954 Snyder ........................ 138/31
3,424,202 A * 1/1969 Lincicome ................... 138/31
3,862,646 A * 1/1975 Tarsha ........................ 138/104
4,691,739 A * 9/1987 Gooden ....................... 138/31
6,003,555 A * 12/1999 Sheng ......................... 138/31
6,286,552 B1 * 9/2001 Shimbori et al. ............. 138/31
6,363,719 B2 * 4/2002 Mohr et al. ................... 138/31
6,527,012 B1 * 3/2003 Weber ......................... 138/31
2001/0037834 A1 * 11/2001 Shimbori et al. ............. 138/31

FOREIGN PATENT DOCUMENTS

DE 3901261 7/1990
DE 19650434 6/1998
DE 19924807 12/2000
GB 1047983 11/1966

* cited by examiner

*Primary Examiner*—James Hook
(74) *Attorney, Agent, or Firm*—Roylance, Abrams, Berdo & Goodman, LLP.

(57) ABSTRACT

A hydropneumatic accumulator includes a bellows inside the accumulator housing, separating a gas chamber from an oil chamber. The bellows is fastened at one end to the accumulator housing so that the oil chamber is delimited by the inside of the bellows, and is sealed on the other free end by a closing body that is movable according to changes in volume of the gas chamber and of the oil chamber. The hydropneumatic accumulator also includes a valve to enable a hydraulic fluid to flow out of and into the oil chamber or to block the flow of the hydraulic fluid. The valve can be moved into its blocking position by the closing body when the closing body undergoes a movement corresponding to an increase in the volume of the gas chamber that exceeds a predetermined maximum value. The closing body is in the shape of a trough, with its edge located on the open end connected to the free end of the bellows. The trough extends with its lateral wall along the inside of the bellows. The bottom of the trough is configured as a moveable valve element of the valve that controls the flow of hydraulic fluid.

6 Claims, 1 Drawing Sheet

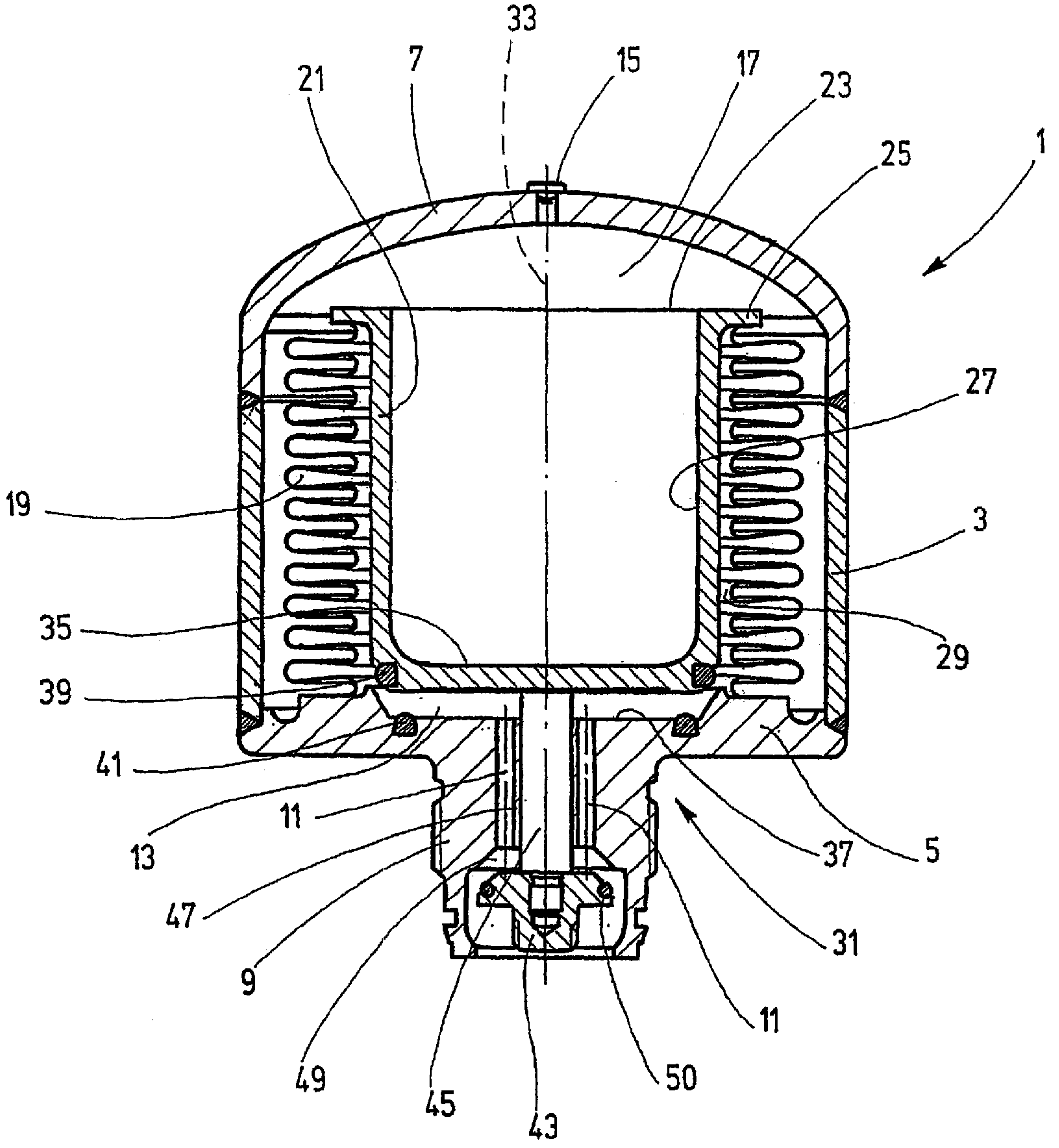
33
21
7
15
17
23
25
1
27
19
3
35
29
39
41
11
13
37
5
47
31
9
11
49
45
43
50

HYDROPNEUMATIC ACCUMULATOR

FIELD OF THE INVENTION

The present invention relates to a hydropneumatic accumulator with a bellows inside the accumulator housing separating a gas space from an oil space. Especially, a metal bellows is fastened to the accumulator housing at one of its ends so that the oil space adjoins the interior of the bellows. The bellows is closed at its other, free end by a closing element movable in response to changes in volume in the gas space and oil space. A valve allows or prevents flow of hydraulic fluid from and into the oil space. The valve, in the event of movement of the closing element corresponding to an increase in the volume of the gas space exceeding an assigned maximum value, may be transferred to its closing position. The closing element is in the form of a trough, the trough being connected by its edge situated on the open end to the associated free end of the bellows. The side wall of the trough extends along the inside of the bellows. The bottom of the trough, as a movable valve element, forms the valve controlling the flow of hydraulic fluid.

BACKGROUND OF THE INVENTION

Care must be taken to prevent overloading of the bellows in the case of bellows accumulators with rubber or metal bellows. In a conventional accumulator with a metal bellows (see WO 97/46823), for preventing overloading the bellows, a valve lifter of the valve connected to the oil space is mounted in a position relative to the closing element of the metal bellows such that the closing element, in the form of a flat end plate of the metal bellows, strikes the valve lifter when a desired end position has been reached and displaces it into the locked position of the valve so that escape of hydraulic fluid from the oil space is prevented when this end position of the end plate of the metal bellows is reached. Consequently, when the valve is closed, a pressure is maintained in the oil space of the accumulator, which pressure corresponds to the gas pressure currently present in the gas space, even if the connected hydraulic system is not under pressure, so that pressure equilibrium prevails on both sides of the metal bellows.

Although overloading of the bellows is thereby prevented when in operation of the accumulator, the pressure of the hydraulic system connected thereto on the oil side drops. The danger nevertheless continues to exist of damage to the bellows under conditions characterized by excess pressure prevailing on the oil side or by absence of prefill pressure on the gas side. The maximum pressure of the gas space volume more or less corresponds to the stroke volume in the case of the conventional accumulator of the type in question. This volume is determined by the movement of the end plate occurring during contraction and expansion of the metal bellows. The length selected for the stroke, which the end plate can execute inside the accumulator housing, must be of adequate length if a volume of the gas space sufficient for operation of the accumulator is to be made available. Consequently, if gas prefill pressure is absent or excess pressure prevails on the oil side, the prevailing pressure gradient acts on the metal bellows which is fully expanded and accordingly subjected to the greatest mechanical stress. Metal bellows which are either thicker or consist of multiple layers must then be used. The resulting disadvantage is sharp increase in rigidity of the spring leading to a relatively poor response characteristic in operation. Multilayer bellows result in increased weight and higher costs. In addition, a smaller stroke is obtained for each turn of the bellows.

GB-A-1 047 983 discloses a generic hydropneumatic accumulator with a bellows inside the accumulator separating a gas space from an oil space. One end of the bellows is fastened to the accumulator housing so that the oil space adjoins the inside of the bellows. The other, free end of the bellows is closed by a closing element movable in response to appropriate volume changes in the gas space and oil space. The accumulator also has a valve releasing or blocking flow of hydraulic fluid from or into the oil space. The valve may be transferred to its blocking position in the event of movement of the closing element corresponding to an increase in the volume of the gas space exceeding an assigned value. The trough is connected by its edge situated on its open end to the associated free end of the bellows. The side wall of the trough extends along the inside of the bellows. The bottom of the trough is in the form of a movable valve element of the valve controlling the flow of hydraulic fluid.

This conventional solution cannot control the end position of the trough corresponding to the minimum value of the volume of the gas space by means of a valve on the oil side.

SUMMARY OF THE INVENTION

Objects of the present invention are to provide an accumulator with an oil/gas bellows separator characterized by improved operating characteristics, in particular also in minimum volume areas of the gas space of the accumulator.

The foregoing objects are obtained by a hydropneumatic accumulator having a valve lifter fastened to the bottom of the trough. The valve lifter extends from the accumulator housing concentrically with the longitudinal axis and is connected to a second movable valve element. On movement of the trough exceeding an assigned minimum gas space volume, this second movable valve element acts in conjunction with a second valve seat blocking flow of hydraulic fluid into the oil space. An advantageous option is created of controlling the end position of the trough, corresponding to the minimum volume of the gas space, by a valve on the oil side. In the event of movement of the trough caused by overpressure on the oil side, inflow of hydraulic fluid into the oil space is blocked by movement of the trough by the valve lifter connected to the trough, and pressure equilibrium is established on the bellows.

During operation of the accumulator of the present invention, once pressure equilibrium has been established between gas prefill pressure in the gas space and hydraulic pressure in the oil space and the trough forming the element closing the bellows is located between its assigned end positions, both valve elements have been lifted from their associated valve seats. Accordingly, flow of fluid has not been blocked. The state of pressure equilibrium at the bellows is continued, irrespective of whether the hydraulic pressure of the oil side may drop in relation to the gas prefill pressure (something which results in closing of the valve) or irrespective of how high the hydraulic pressure may rise relative to the gas prefill pressure (something which in turn results in blocking of the valve, so that additional inflow into the oil space is no longer possible).

The structure employed, in which the bellows encloses the exterior of a trough open on the gas side, is advantageous in several respects. Since the whole interior of the trough is available as part of the gas space, an optimal relationship of total size of the accumulator housing to volume of the gas space is achieved. In the case of the conventional pressure accumulator, an adequate gas space volume can be realized only by allowing an adequate path of travel for the end plate of the metal bellows in the accumulator housing, resulting the overloading problems discussed. In the case of the present invention, the path of travel corresponding to extension of the bellows may be virtually as small as desired. In other words, the accumulator housing may be designed so that beyond a short path of movement of the trough, it forms a mechanical stop, since the whole interior of the trough is available as gas space volume.

In this way, the bellows is protected from extending too far, since it surrounds the exterior of the trough. Under the overpressure prevailing in the gas space, the bellows is also supported mechanically over its entire length by the exterior of the trough. This, in turn, permits build-up of the gas prefill pressure before commencement of operation of the accumulator, that is, before the hydraulic system is connected on the oil side. If the latter is the case and once the operating pressure has been built up in the oil space, pressure equilibrium is maintained on the bellows by the valve controlling flow of hydraulic fluid from the oil space. Since the trough is surrounded externally by the bellows, a very slight "dead volume" results between trough and bellows, so that only a small amount of hydraulic fluid need be introduced before the gas space is charged, this in turn resulting in saving of weight and costs.

Since the bottom of the trough is simultaneously in the form of a movable valve element, an especially compact and simple structure is also obtained.

The trough is preferably in the form of a regular or right circular cylinder. The depth can be assigned to the trough such that its bottom serving as valve element acts as a movable round valve disk operating in conjunction with a valve seat formed on the interior wall of the accumulator housing. This arrangement results in a particularly simple valve structure. Since the entire surface of the bottom of the trough is available as a valve disk, an especially large sealing surface can be obtained when the valve is closed. For example, for this purpose an O-ring may be provided for formation of an annular sealing surface in the radial external marginal area.

The valve lifter also performs a control function during the lifting movement of the bellows. Proper seating of the trough bottom serving as a valve element on valve seat and accordingly blocking of the valve are thereby ensured.

Since the bellows operates in the state of equilibrium, a light bellows structure may be employed. This results both in weight reduction and in especially good response behavior.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawing which forms a part of this disclosure:

FIG. 1 is a side elevational view in section of an accumulator with a metal bellows according to an embodiment of the present invention.

DETAILED DESCRIPTION OF THE INVENTION

The accumulator embodiment disclosed is provided in particular for use in electrohydraulic braking systems and has an accumulator housing 1. This housing has a more or less cylindrical main component 3, closed on one side by a welded-on bottom cover 5 and on the other side by a welded-on flat-domed end cap 7. In the bottom cover 5, a central hydraulic connection 9 is provided with passages 11 for delivery and drainage of a hydraulic fluid to and from the oil space 13 inside the accumulator housing 1. Provided on the end cap 7 is a centrally positioned gas filler passage which is closed by a plug 15. The gas filler passage permits producing a desired gas prefill pressure by filling the adjoining gas space 17 of the accumulator housing 1 with a compressible gas, for example, nitrogen.

A metal bellows 19 is in the form of a regular or a right circular cylinder, and is rigidly connected at its end to a bottom cover 5. The bellows serves as a partition between this gas space 17 and the oil space 13. A hydraulic system (not shown) communicates with the oil space by way of the hydraulic connection 9. The exterior diameter of the metal bellows 19 is somewhat smaller than the interior diameter of the cylindrical main component 3 of the accumulator housing 1. On its free end opposite the bottom cover 5, the metal bellows 19 is tightly sealed by a closing element in the form of a trough 21. In the illustrated embodiment, trough 21 is in the form of a regular or right circular cylinder and has an exterior diameter which is somewhat smaller than the interior diameter of the metal bellows 19. The trough 21 is fastened at its open end 23 to a flange-like edging 25 extending radially outward on the associated free end of the metal bellows 19. The side wall 27 of the trough 21 extends along the inner side of the metal bellows 19 surrounding the trough. The interior of the metal bellows 19 merely forms a part of the oil space 13 with the narrow annular space 29 between the exterior of the side wall 27 of the trough 21 and the inside of the metal bellows 19.

The gas space 17, on the other hand, has a much larger volume. Inside the accumulator housing 1, the annular space 28 on the exterior of the metal bellows 19, the space adjoining the upper end cover 7, and the entire interior of the trough 21 are available as gas space.

Associated with the hydraulic connection 9 is a double-acting oil valve 31. Valve 31 has valve units blocking or allowing flow of hydraulic fluid through passages 11 in opposite directions. These valve units may be controlled by movements of the metal bellows 19 and accordingly of the trough 21 when the metal bellows 19 expands or contracts as a result of pressure differences in the oil space 13 and the gas space 17. The trough 21 executes a corresponding movement along the central longitudinal axis 33 of the accumulator housing 1. The depth of the trough 21 is measured so that, when there is no load on the metal bellows 19, for example, when both oil space 13 and gas space 17 are not subjected to pressure, the trough bottom 35 extends into the vicinity of the interior wall 37 of the bottom cover 5. The trough bottom 35 is designed as a circular valve disk and forms one of the valve units together with the adjacent interior wall 37. Interior wall 37 is designed as an associated valve seat. An O-ring 39 on the exterior edge of the trough bottom 35 and an O-ring on the interior wall 37 of the bottom cover 5 are provided for formation of sealing surfaces. These O-rings 39 and 41 are introduced into corresponding annular grooves. Because of the relatively large radial distances of the sealing surfaces from the central longitudinal axis 33 determined by the diameter of the trough 21, a large sealing area and so very certain locking of the valve are guaranteed.

The second valve unit has a valve element 43 which may be moved together with the trough 21 by a valve lifter 45 fastened to the bottom 35 of the trough 21. The valve lifter 45 extends through a central borehole 47 in the bottom cover 5 outside the accumulator housing 1. The valve element 43 operates in conjunction with a valve seat 49 formed in the hydraulic connection 9 and has an O-ring 50 engagable on the valve seat 49.

When the metal bellows 19 contracts, because of the overpressure condition in the gas space 17 in relation to the oil space, the trough 21 moves, together with its trough bottom 35 serving as a valve disk, into contact with the inner wall 37 of the bottom cover 5. The O-rings 39 and 41 come to rest against surfaces of valve seat or valve disk and drainage of hydraulic fluid through the passages 11 from the oil space 13 is blocked. If, on the other hand, a higher pressure is present in the oil space 13 than in the gas space 17, a corresponding displacement of the trough 21 by way of the valve lifter 45 results in a movement of the valve element 43 to block flow of hydraulic fluid into the oil space 13 as a result of the O-ring 50 resting against the valve seat 49. The condition of pressure equilibrium between oil space 13 and gas space 17 again arises. This means that the accumulator of the present invention is controlled by the presence of the double action valve 31. Both outflow of hydraulic fluid and inflow of hydraulic fluid are automatically controlled in operation in view of the maintenance of equilibrium of pressure on the metal bellows 19. In this manner, the highest operational reliability is guaranteed over long periods of operation. Also, metal bellows of lighter design may be employed to corresponding advantage. In addition, as a result of the fact that a trough 21 extending into the interior of the metal bellows 19 is provided as an element for closing the open end of the metal bellows 19 as a movable valve element, design of the valve is simplified by use of the trough bottom 35 as movable valve element. A special advantage is that virtually the entire volume of the trough 21 is available as partial volume of the gas space 17.

A non-metallic bellows may, of course, also be provided in place of the metal bellows 19 in the example described.

While one embodiment has been chosen to illustrate the invention, it will be understood by those skilled in the art that various changes and modifications can be made therein without departing from the scope of the invention as defined in the appended claims.

What is claimed is:

1. A hydropneumatic accumulator, comprising:

an accumulator housing having a gas space and an oil space therein, and having a longitudinal axis;

a bellows within said housing separating said gas space from said oil space, said bellows having one end fastened to said housing such said oil space adjoins an inside of said bellows and having a free other end;

a closing element closing said other end of said bellows and movable in response to volume changes in said gas space and said oil space, said closing element being a trough having an edge on an open end thereof connected to said other end of said bellows, having a side wall extending along said inside of said bellows and having a bottom;

a first valve having a first valve element formed by said bottom of said trough movable between releasing and blocking positions to control flow of hydraulic fluid from and into said oil space by said closing element, with said blocking position corresponding to a volume of said gas space exceeding an assigned maximum value; and a valve lifter fastened to said bottom of said trough, extending from said housing concentric with said longitudinal axis and connected to a second movable valve element operating in conjunction with a second valve seat of a second valve to block hydraulic fluid flow into said oil space upon movement of said trough to a position corresponding to a volume of said gas space below an assigned minimum gas volume in said gas space.

2. A hydropneumatic accumulator according to claim 1 wherein said trough is cylindrical and has a depth;

said bottom of said trough forms a circular, movable first valve disk; and said housing includes a first valve seat on an inner wall thereof, said first valve seat operating in conjunction with said first valve disk.

3. A hydropneumatic accumulator according to claim 2 wherein said first valve seat is annular and concentric with said longitudinal axis, and encloses a passage for hydraulic fluid.

4. A hydropneumatic accumulator according to claim 3 wherein sealing surfaces extend on said first valve disk and said first valve seat concentrically with said longitudinal axis adjacent external edges thereof.

5. A hydropneumatic accumulator according to claim 4 wherein said sealing surfaces comprise O-rings seated in annular grooves.

6. A hydropneumatic accumulator according to claim 1 wherein said bellows is a metal bellows.

* * * * *